Figure 1:
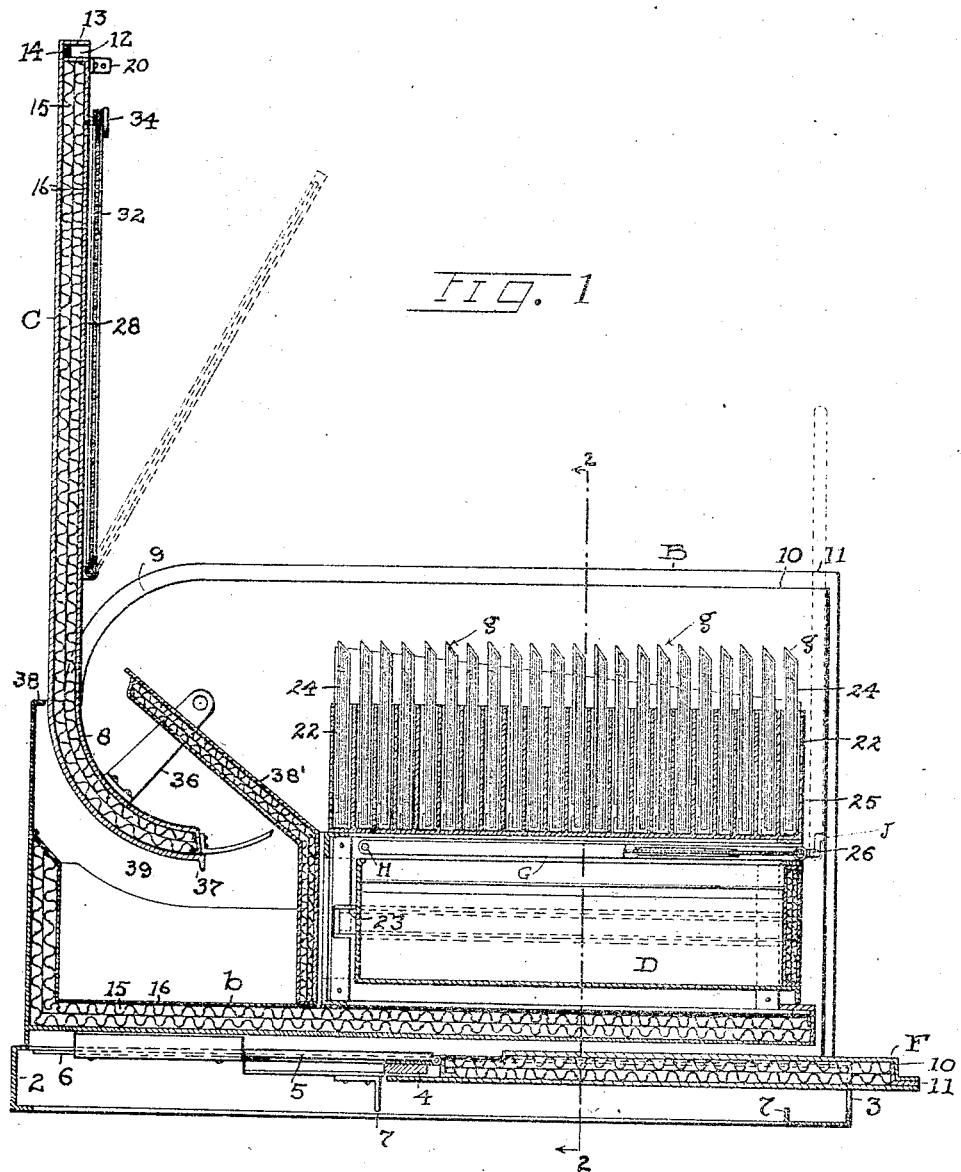

F. G. MARBACH.
FIREPROOF ACCOUNTING CABINET.
APPLICATION FILED AUG. 9, 1917.

1,287,381.

Patented Dec. 10, 1918.
5 SHEETS—SHEET 1.

WITNESSES:
Geo. E. Kriener.

INVENTOR.
FRANK G. MARBACH.
BY Fisher & ————
ATTORNEYS.

F. G. MARBACH.
FIREPROOF ACCOUNTING CABINET.
APPLICATION FILED AUG. 9, 1917.

1,287,381.

Patented Dec. 10, 1918.
5 SHEETS—SHEET 2.

WITNESSES:
Geo. E. Kricker

INVENTOR.
FRANK G. MARBACH.
BY
Fisher & Moser
ATTORNEYS.

F. G. MARBACH.
FIREPROOF ACCOUNTING CABINET.
APPLICATION FILED AUG. 9, 1917.
1,287,381.
Patented Dec. 10, 1918.
5 SHEETS—SHEET 3.
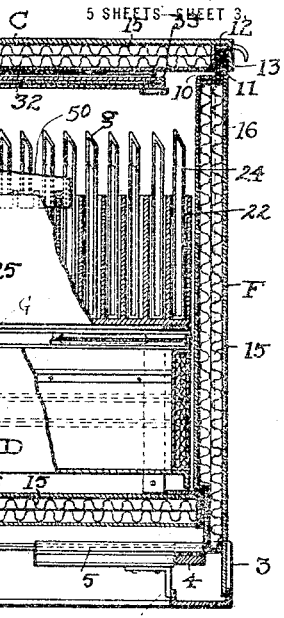
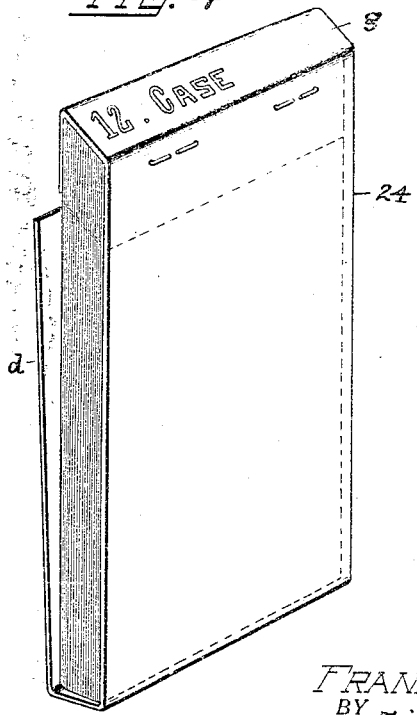
WITNESSES:
Geo C. Kricker
INVENTOR.
FRANK G. MARBACH
BY Fisher &
ATTORNEYS.

F. G. MARBACH.
FIREPROOF ACCOUNTING CABINET.
APPLICATION FILED AUG. 9, 1917.
1,287,381.
Patented Dec. 10, 1918.
5 SHEETS—SHEET 4.
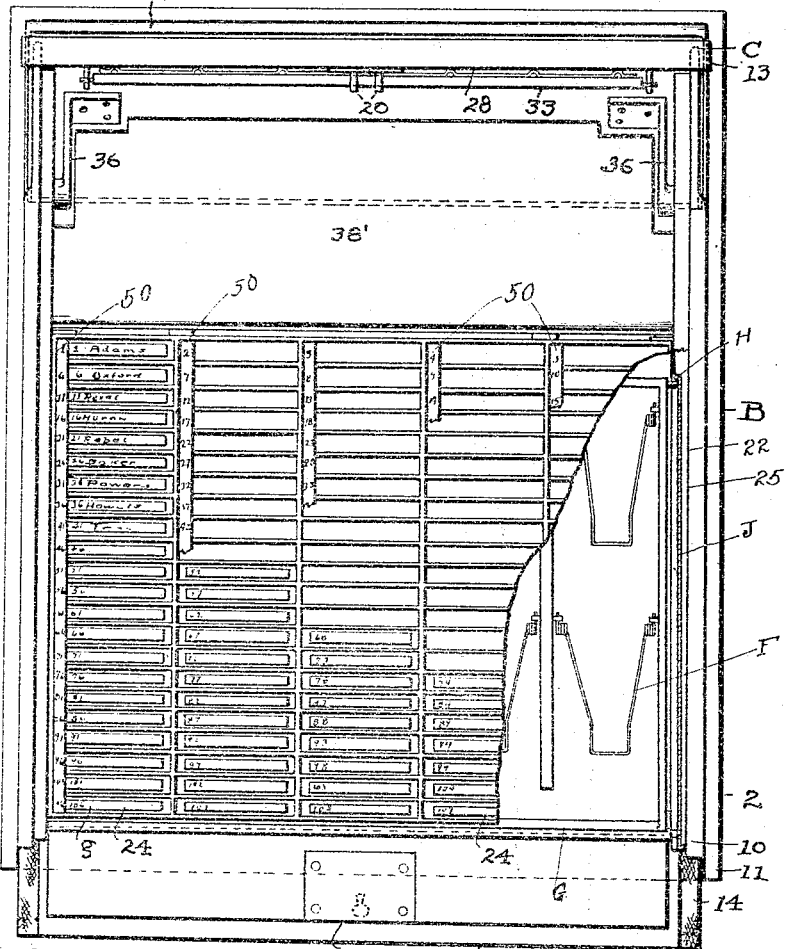
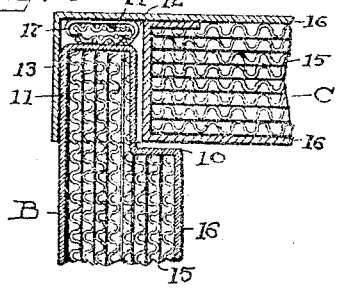
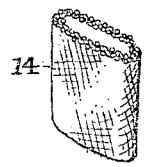
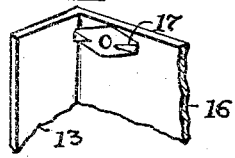
WITNESSES:
Geo. E. Kricker.
INVENTOR.
FRANK G. MARBACH
BY Fisher & Moser
ATTORNEYS.

F. G. MARBACH.
FIREPROOF ACCOUNTING CABINET.
APPLICATION FILED AUG. 9, 1917.
1,287,381.
Patented Dec. 10, 1918.
5 SHEETS—SHEET 5.
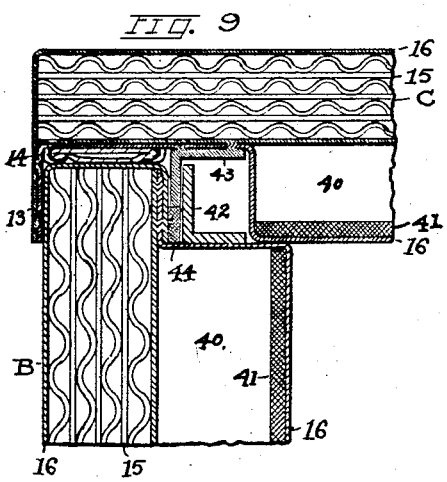
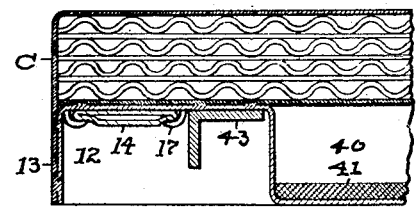
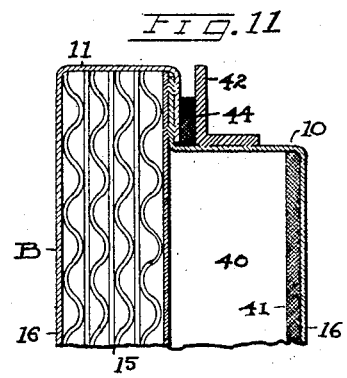
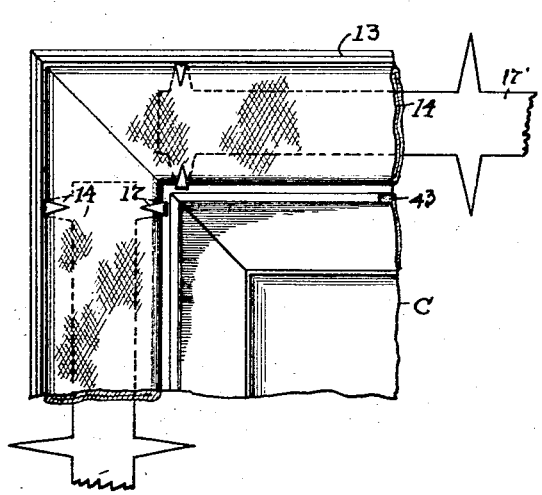
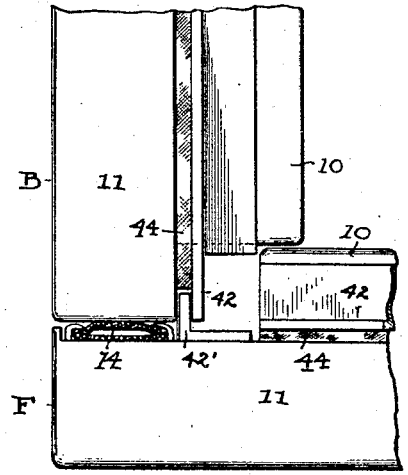
WITNESSES:
Geo. C. Kricker.
INVENTOR.
F. G. MARBACH.
BY Fisher &
ATTORNEYS.

UNITED STATES PATENT OFFICE.

FRANK G. MARBACH, OF CLEVELAND, OHIO, ASSIGNOR TO THE CHAMPION REGISTER COMPANY, OF CLEVELAND, OHIO, A CORPORATION OF OHIO.

FIREPROOF ACCOUNTING-CABINET.

1,287,381. Specification of Letters Patent. Patented Dec. 10, 1918.

Substitute for application Serial No. 61,352, filed November 13, 1915. This application filed August 9, 1917. Serial No. 185,406.

*To all whom it may concern:*

Be it known that I, FRANK G. MARBACH, citizen of the United States, residing at Cleveland, in the county of Cuyahoga and State of Ohio, have invented certain new and useful Improvements in Fireproof Accounting-Cabinets, of which the following is a specification.

This invention relates to a fire-proof accounting cabinet, and the invention consists in the construction and combination of parts substantially as shown and described and particularly pointed out in the claims.

The object of the invention involves the production of a fire-proof cabinet capable of holding a large number of memorandum pads or account books in a small space and in compact and close relations in a series of compartments arranged in a horizontal plane and with said pads or books particularly constructed and related to enable individual ones to be easily and quickly distinguished and withdrawn and replaced in its proper compartment. The cabinet and its pads or books is especially intended for retail merchants having regular customers who are running accounts and are making purchases more or less daily, as with grocers, bakers, butchers and others. With trades of this kind, it has been found convenient to have a separate pad or book for each customer, in which all the current sales are noted and which can be conveniently found under ready references or indexes displayed in the cabinet, thus superseding and dispensing with all other sales memoranda and books especially provided for such purposes before the present form of keeping accounts was adopted. Of course, I do not claim that I am the first to use memorandum pads or account books in connection with a compartmented receptacle, nor a memorandum cabinet as such broadly and of which there are many different forms on the market and familiar to me, but I do lay claim to the special construction of fire-proof cabinet set forth and to the style of pad and the particular positioning and grouping of the compartments and the pads in respect to each other on the same horizontal plane within the cabinet, whereby the ultimate effect of grouping the parts is to produce a very compact cabinet and arrangement of pads and a more advantageous way of utilizing the same.

Figure 2:
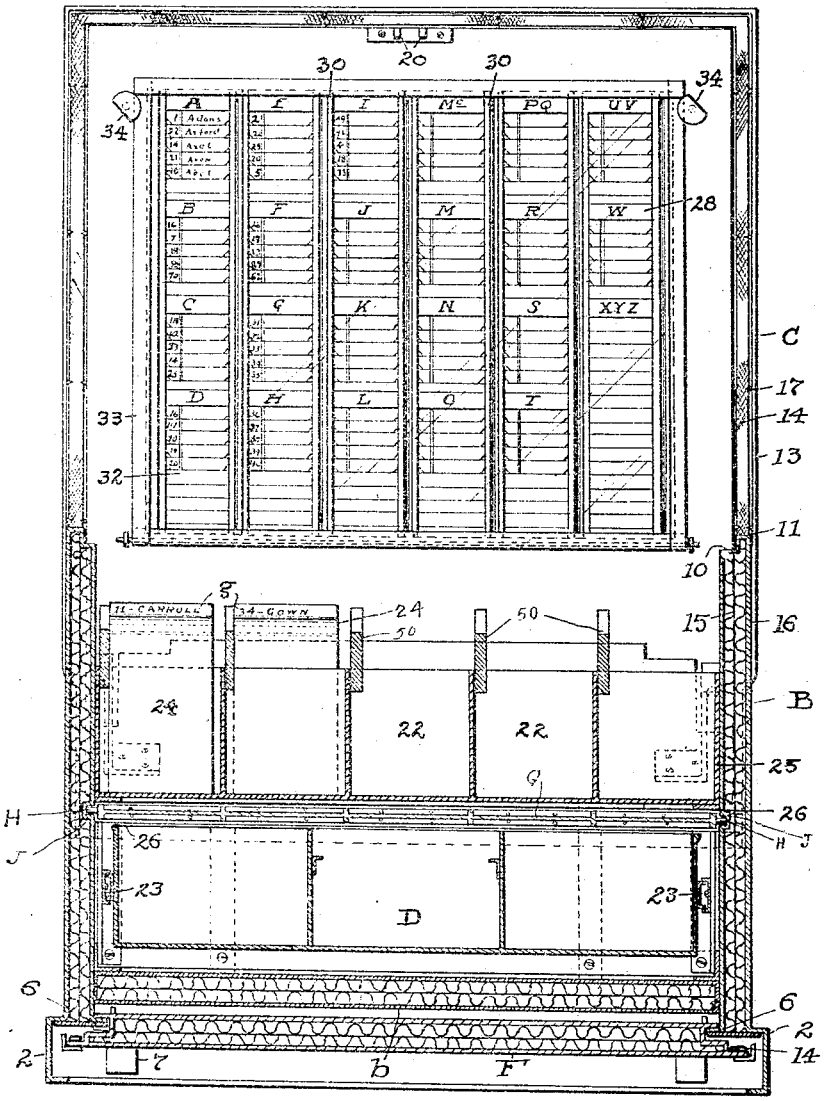

In the accompanying drawings, Figure 1 is a sectional elevation of the cabinet front to rear, with the cover open. Fig. 2 is a sectional elevation on line 2—2, Fig. 1. Fig. 3 is a side elevation of the cabinet with the cover closed and partially sectioned at its forward side portion. Fig. 4 is a perspective view of one of the memorandum pads especially constructed for use with this particular construction of cabinet. Fig. 5 is a plan view with the cover open and the parts displayed as in Fig. 1. Fig. 6 is a sectional view of a corner of the cabinet with the cover closed and showing the non-combustible strip as sealing the joint. Fig. 7 is a perspective view of a section of asbestos or like tape shown in cross section, Fig. 6. Fig. 8 shows an angle of the cover with a clip or prongs for fastening the said tape. Figs. 9 to 13 represent a modification of the foregoing construction and in some respects what may be regarded as a preferred form of the invention, the difference being in details rather than as a whole and which is an elaboration of the fire-proof feature of the cabinet. Thus, Fig. 9 is a sectional elevation of a corner of the cabinet with the lid down, as in Fig. 6, but showing additional and comparatively deep air spaces in both side and top or cover of the cabinet. Fig. 10 is a sectional view of the cover alone, as seen in Fig. 9, and Fig. 11 is a sectional view of the side of the cabinet alone, as seen in Fig. 9. Fig. 12 is a face view, inside of the corner of the cover. Fig. 13 is a plan view of one corner of the cabinet showing the joint made at the front of the side wall by the separable front wall or door.

The cabinet as shown in Figs. 1 to 8 inclusive comprises a body B, a cover C and a front section or member F which, in a proper sense, constitutes a portion of the body but which, for convenience, is an independent part or member hinged at its bottom and adapted to be swung down and run under the cabinet in position about as shown in Fig. 1, or to be left almost or entirely out and serve as a desk or shelf at the front of the cabinet. The bottom proper of the cabinet is indicated by *b* and is rigid with the side and rear walls thereof, and the said walls drop beneath said bottom and are shouldered outward all around forming an enlargement as seen at 2, while the front of said enlargement is cut away along its top as seen at 3 to make room for the introduction of the front F beneath bottom $b$.

The said front section is hinged on a hinge frame 4 having rigid side projections 5 slidably mounted on ledges 6 on the inside beneath bottom $b$. A stop or stops 7 limit the withdrawal of the said hinge frame and fix the point from where the front F can be raised or turned on its hinge on said frame 4 to a closed position, Fig. 3, or left open for use as a desk or shelf. When closed the top or cover C makes a close corner and edge engagement therewith, said members being constructed with shoulders and overlapping portions as seen at 10, 11, 12 and 13, respectively, Fig. 3. Thus, the front F has an inside shoulder 10 closely overlapped by the cover and a tongue 11 projecting into a channel 12 in the cover and which has an overlapping lip or flange 13 outside said tongue and helping to make the seat heat and flame proof. This precaution is further supplemented by an asbestos or like nonconducting and non-combustible ribbon or strip 14 laid in the space 12 between said parts, Fig. 6, which figure in fact represents the actual construction of the cabinet and which preferably has eight layers of corrugated asbestos or like fire-proof board 15 between the metal sheets 16 instead of only four as in the preceding figures. In this connection it should probably be explained that the cabinet is designed to be actually fire-proof against all ordinary fires. Fig. 6 represents the usual wall construction and asbestos ribbons or strips are secured by prong-shaped clips 17 at intervals or their equivalent.

The cover C has lugs 20 adapted to be engaged in key controlled lock 21 set into the edge of the front section F, and the space immediately over or above bottom $b$ is occupied by a drawer D which, in this instance, is slidably supported at its sides on guideways 23 and may be used for money or other purposes.

The memorandum or accounting pads 24 are of the usual size and construction except in the important particular hereinafter noted, and are kept in the several series of correspondingly-shaped pockets or subdivisions 22 in the receptacle or tray 25, which is supported upon skeleton frames 26 within the side walls of the cabinet. The said tray or pocketed receptacle usually is of a size adapted to more or less completely fill or occupy the cabinet, say about as shown, and adapted to receive 110 pads, in this instance, in five series or columns. The pads 24 stand above the walls of the pockets substantially as shown, so as to be conveniently gripped by the fingers, and they may be arranged alphabetically by names, but experience has shown that this is not always practicable to maintain. If it were there would be no occasion for having any other way of designating the pads. But when there are several clerks using pads out of the same cabinet the pads are liable to be put back into wrong pockets, and hence the mere alphabetical arrangement becomes confused. I have, therefore, supplemented each pad with a given number in addition to the name of the owner and employ an index table 28, see Fig. 2, on which I print or provide reference numerals with each and all the names in alphabetical order. It therefore follows that if a given pad be misplaced reference can be had to the name in the index 28 on the upturned cover C where the number opposite the name will help to locate the particular pad wanted, each pad having the number opposite the name on the index. A separate card with its name and number is inserted for each person in the series of guide ways 30 for the index columns and adapted to be separately inserted and replaced, and a glass window 32 in a suitable border frame or sash 33 is hinged at its bottom to the cover C and temporarily secured by rotatable buttons 34, or their equivalent at the top and sides.

The said cover is constructed to be thrown back to an upright position and automatically held therein and supports the said index table where its names and numbers are clearly exposed to view. Instead of hinging the cover in an ordinary way I have developed a construction by which it is turned easily to either position while still affording a fire-proof joint, and to these ends the cover is formed with a segmental curved inner or rear portion 8 conforming to the curved portion 9 of the upper edge of the side walls and adapted to turn into the rear of the cabinet. The actual supports for the cover comprise hangers 36 pivotally engaged with the sides of the cabinet at the center or axis of said curved edge portion, thus being adapted to swing the door on a radius corresponding to said curvature and so that when closed the right-angled rear edge 37 of the door will rise and engage the flange 38 on the rear wall and provide fire-proof closure at the joint. The intermediate wall 38' also subdivides the cabinet at the rear to provide an air chamber 39 and fire-proof guard at the rear of the compartmented portion of the cabinet.

The pocketed tray for the pads occupies a horizontally disposed position in the cabinet so that a compact and relatively shallow and not a very high cabinet is produced. The vertical compartments of pockets in this tray are subdivided only by thin sheet metal walls. This unavoidably brings the pads together in almost solid ranks with the tops of the pads all on the same horizontal plane, and ordinarily this would render the readable matter on their top very difficult to distinguish by a person standing in front of the cabinet, especially if the cabinet rests on a raised counter. That is, reading and selection of the pads is too confusing and impracticable if the pads are made and grouped with their flat top edges all on the same horizontal plane. Hence, I have conceived the idea of making the pads with a beveled end edge, the beveled face being approximately at a 45 degree angle to the sides of the pad as indicated by $g$, thus providing each pad with a broad front top surface which faces directly toward the front of the cabinet and enables proportionately large designating characters to be employed. By these means each pad is not only clearly readable from the front on a direct line of sight but those at the rear of the tray are practically as plain in view as those at the front, and beveling enables the fingers to be inserted between adjacent pads to withdraw the pads conveniently and without injury. The cardboard or other like cover $d$ protects the separable sheets comprising the body of the pad and makes it convenient to enter the pad into the compartments or pockets, and the bound ends are bent to a slant and bear the distinguishing marks of the pad while the unbound ends are inserted downward. Obviously, pads having beveled ends, combined with horizontally disposed pockets grouped closely together permit many pads to be stored closely together while each and every pad is still exposed to plain view and easily reached and removed. Room is economized, a large number of pads can be used in a given space, and the cabinet can be made relatively low in height and comparatively small considering the number of pads or books contained therein.

The arrangement of pockets and pads as shown below the level of the wall of the cabinet, makes it desirable to lower or remove the front wall F, but this is more essential where a drawer D is used than otherwise.

In Figs. 9 to 13 I show what may be termed the preferred construction of cabinet from a fire proof point of view. These views differ from the foregoing in that the wall of the cabinet by which I also mean the top and bottom, is supplemented by a distinct air space 40 of a depth which practically doubles the total depth of the wall and is surfaced on its inside with a comparatively heavy asbestos board 41. Angle bars 42 and 43 also are fixed on the side wall and the cover of the cabinet respectively in the angle of their closure and a strip 44 of asbestos seals the space between said plates and provides a cushion for angle bar 43. This arrangement strengthens the cover and walls and makes an effective fire proof joint. Otherwise the cabinet conforms to the construction disclosed in Figs. 1 to 6. In Fig. 12, the pointed clips 17 are integral parts of flat metal strips 17' which are electrically spot welded upon the cover or body part C.

A further feature of the cabinet is embodied in the slidable leaf or plate located beneath the tray of pockets above the drawer D. This leaf or plate has a series of spring clips F', see Fig. 5, mounted upon one or both sides thereof, whereby loose clips or bills representing miscellaneous accounts can be filed away for convenient reference. For this purpose, the plate is slidably supported at its rear end by short trunnions or pins H which travel in grooves or channels J in the side wall of the cabinet. These channels extend to the front of the cabinet to permit the plate to be withdrawn and turned upright as shown in dotted lines, Fig. 1, and the outer ends of the channels are of irregular outline and open to permit the plate to be bodily removed from the cabinet whenever the occasion requires.

By combining an interchangeable alphabetical card index on the cover, with a numerical index for the memorandum pads or account books in the pocketed tray, it is possible to widely segregate the accounts of parties having similar or confusing names, thereby avoiding errors. A very compact grouping of the accounts is also possible; no shifting of the books to accommodate new accounts is necessary; and it is an easy matter to locate any single account by number or name when the cover is raised to place the alphabetical index in a perpendicular position at right angles to the horizontally arranged numerical index in the tray.

The tray index consists of narrow triangular shaped strips 50, each of which are notched transversely at their lower edge to engage the transverse divisional walls of the tray adjoining the longitudinal walls at one end of the pockets. The upper edge of each strip 50 is inclined downwardly from the rear to the front of the cabinet to place the index numerals thereon more in a direct line of vision to the person standing in front of the cabinet, and the numbers on each strip edge are in multiples of 5, preferably, and the successive strips from left to right numbered from 1 to 5 at the top and in like order as to the remaining multiples of 5. This arrangement also greatly facilitates the finding and placing of pads in their proper pockets.

What I claim is:

1. An account cabinet provided with a tray having subdividing walls at intervals at right angles to each other forming pockets and separate index strips arranged at the sides of the longitudinal walls in said tray, said strips having inclined upper edges indexed to each compartment and notched lower edges engaged over the divisional walls of the tray and removably supported thereon.

2. An account book cabinet having a front wall adapted to be opened to a horizontal position and having a relatively shallow chamber at about its middle with channels at its sides, in combination with a flat holder for account slips mounted to slide in said channels and adapted to be drawn out of the said chamber and to swing into an upright position at the front of the cabinet.

3. An account cabinet comprising a frame having a front wall adapted to be lowered and provided with channels at about its middle in its sides turned upward and open at their front ends within the said front wall, a plate slidably supported in said channels and pivotally connected therewith to permit withdrawal and a turning movement of the plate to an upright position when said front wall is lowered, and a series of independent holders on the top of said plate to removably secure memorandum slips flatwise upon the face thereof.

Signed at Cleveland, in the county of Cuyahoga, and State of Ohio, this 30 day of July, 1917.

FRANK G. MARBACH.

Copies of this patent may be obtained for five cents each, by addressing the "Commissioner of Patents, Washington, D. C."